(12) United States Patent
Heim

(10) Patent No.: US 9,008,217 B2
(45) Date of Patent: Apr. 14, 2015

(54) METHOD AND ASSEMBLY FOR TRANSMITTING SENSOR SIGNALS

(75) Inventor: Jens Heim, Bergrheinfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 109 days.

(21) Appl. No.: 13/807,775

(22) PCT Filed: May 23, 2011

(86) PCT No.: PCT/EP2011/058349
§ 371 (c)(1),
(2), (4) Date: Dec. 31, 2012

(87) PCT Pub. No.: WO2012/000718
PCT Pub. Date: Jan. 5, 2012

(65) Prior Publication Data
US 2013/0101065 A1 Apr. 25, 2013

(30) Foreign Application Priority Data
Jul. 2, 2010 (DE) .......................... 10 2010 025 872

(51) Int. Cl.
*H04L 27/00* (2006.01)
*H04L 25/02* (2006.01)
*G08C 15/06* (2006.01)
*H04Q 9/00* (2006.01)

(52) U.S. Cl.
CPC ............. *H04L 25/028* (2013.01); *G08C 15/06* (2013.01); *H04Q 9/00* (2013.01); *H04Q 2209/826* (2013.01)

(58) Field of Classification Search
USPC .......................................... 375/295, 219, 257
See application file for complete search history.

(56) References Cited

U.S. PATENT DOCUMENTS

| | | | | |
|---|---|---|---|---|
| 6,542,847 B1* | 4/2003 | Lohberg et al. | ............... | 702/148 |
| 6,687,644 B1* | 2/2004 | Zinke et al. | ................... | 702/145 |
| 7,830,278 B2* | 11/2010 | Lohberg et al. | ................. | 341/11 |
| 7,907,085 B2* | 3/2011 | Weiberle et al. | .............. | 342/175 |
| 2004/0100251 A1* | 5/2004 | Lohberg | ........................ | 324/166 |

(Continued)

FOREIGN PATENT DOCUMENTS

| | | |
|---|---|---|
| DE | 19650935 | 6/1998 |
| WO | 9949322 | 9/1999 |
| WO | 02090999 | 11/2002 |

*Primary Examiner* — Kenneth Lam
(74) *Attorney, Agent, or Firm* — Volpe and Koenig, P.C.

(57) ABSTRACT

The invention relates to a method for transmitting sensor signals, comprising the following steps: a first sensor (4), in particular a rotational speed sensor, supplies an alternating signal, which is present in the form of a sequence of sensor pulses (50) and pulse pauses (52) of predetermined duration, wherein in the pulse pauses (52) additional data (54) is transmitted as a bit sequence and wherein the bit sequence contains at least one free bit (56); a binary information sequence (60) comprising data from at least one further sensor (12, 14, 22, 30, 38a, 38b, 38c) is generated, which has a transmission length of a plurality of bits; and the data of the first sensor (4) and of the at least one further sensor (12, 14, 22, 30, 38a, 38b, 38c) is transmitted through a common data line (18) in that a processing unit (20) distributes the information sequence (60) to a plurality of chronologically sequential bit sequences and the at least one free bit (56) of the additional data (54) is assigned at least one bit of the information sequence (60). The information sequence (60) is thus reliably transmitted, even when it contains more bits than there are free bits available in the additional data (54).

12 Claims, 5 Drawing Sheets

(56) References Cited

U.S. PATENT DOCUMENTS

| | | | |
|---|---|---|---|
| 2004/0249544 A1* | 12/2004 | Lohberg | 701/70 |
| 2007/0177321 A1* | 8/2007 | Weiberle et al. | 361/93.1 |
| 2009/0278711 A1* | 11/2009 | Lohberg et al. | 341/11 |
| 2012/0158335 A1* | 6/2012 | Donovan et al. | 702/79 |
| 2013/0136119 A1* | 5/2013 | Hund et al. | 370/350 |

* cited by examiner

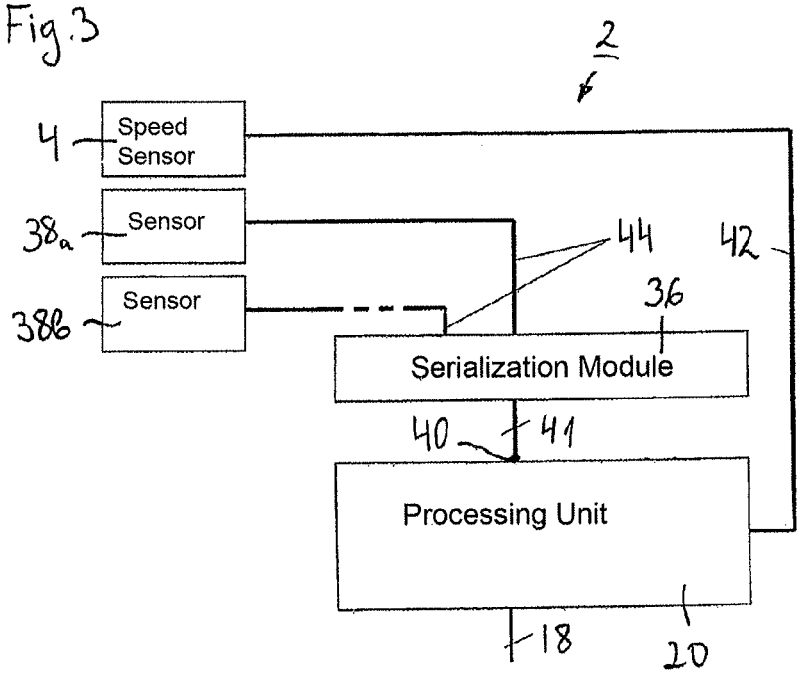
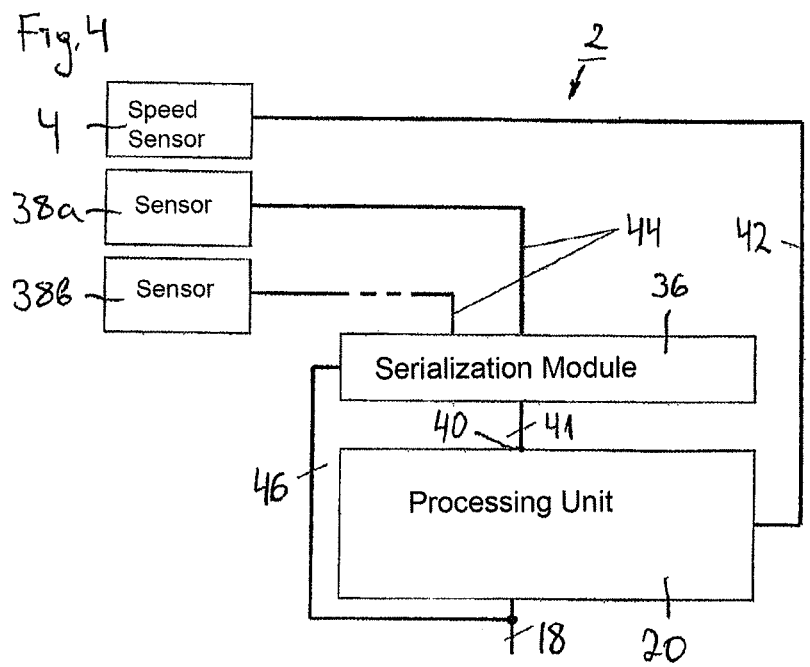

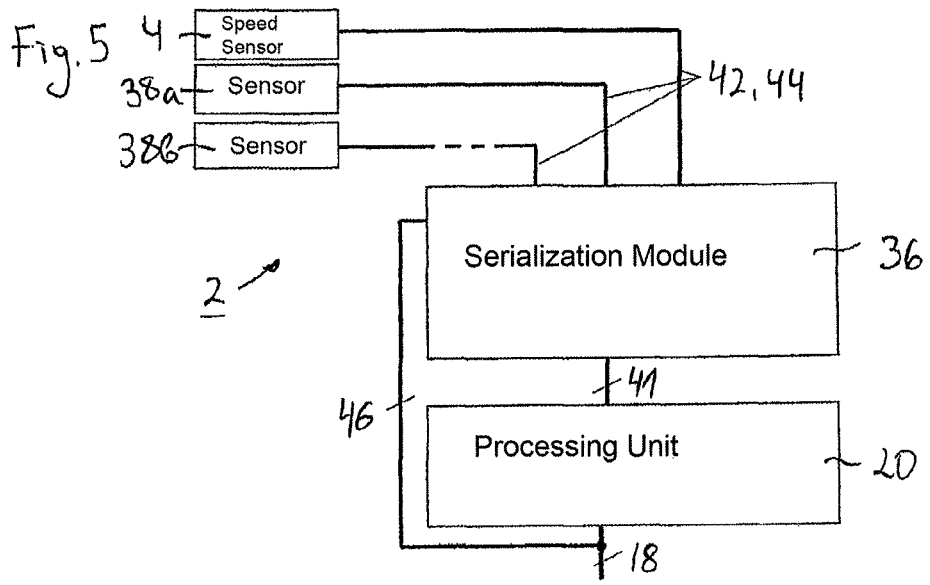
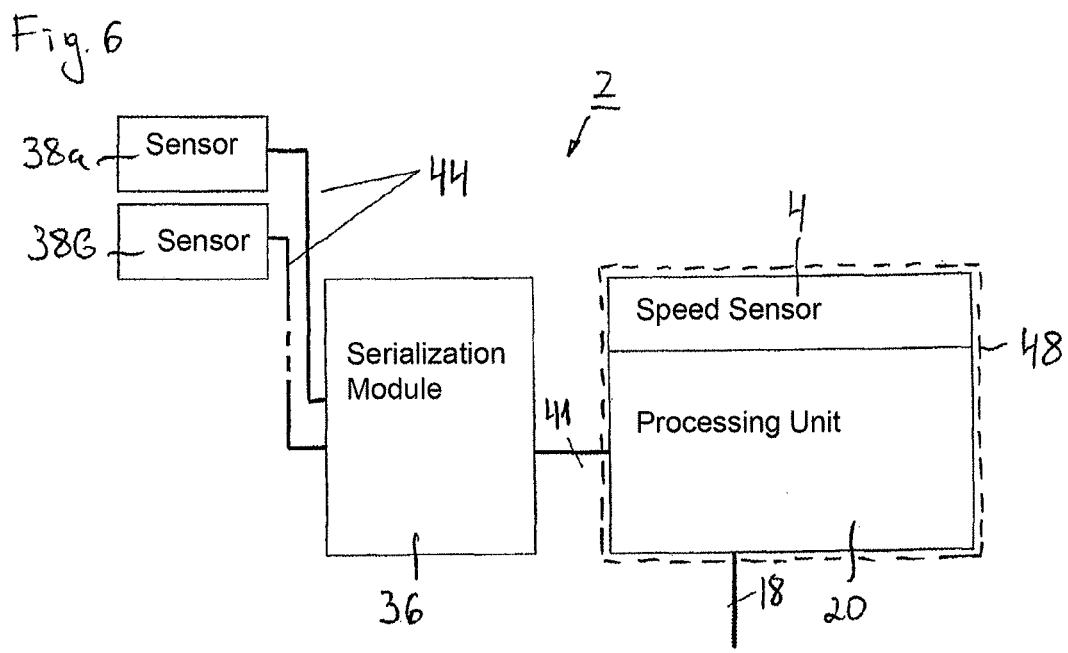

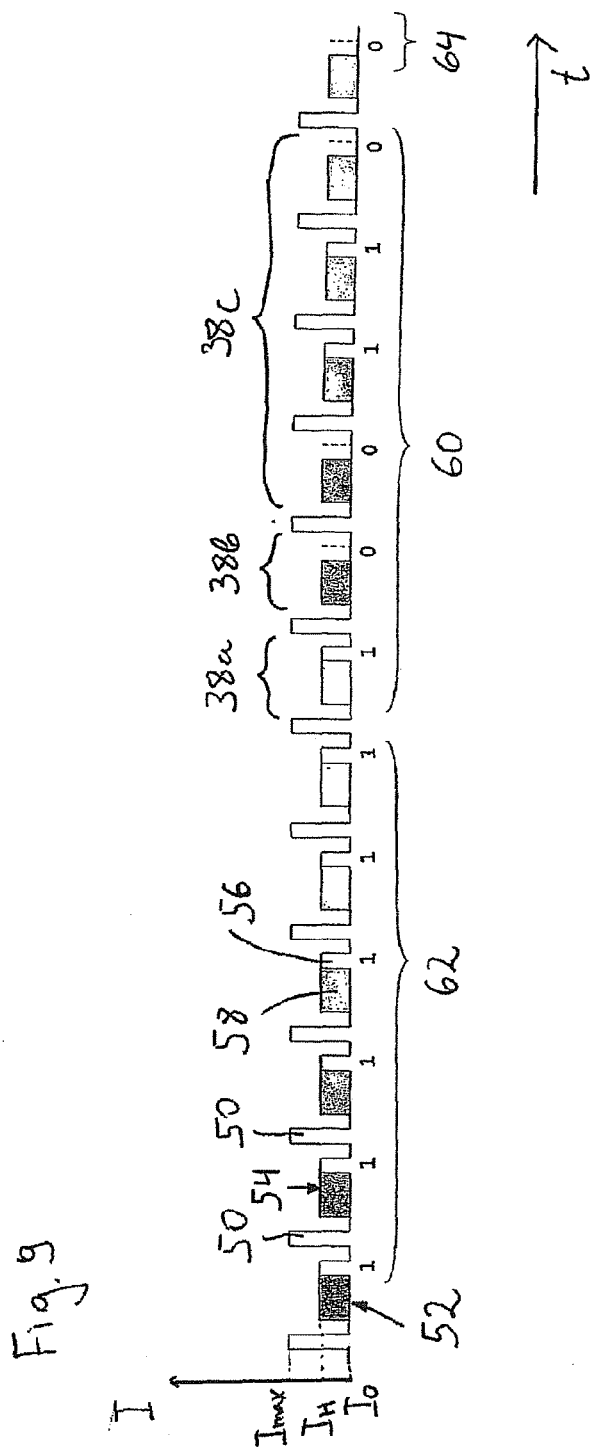

METHOD AND ASSEMBLY FOR TRANSMITTING SENSOR SIGNALS

FIELD OF THE INVENTION

The invention relates to a method as well as an arrangement for transmitting sensor signals

BACKGROUND

In the field of automotive vehicles, active sensors are used for recognizing rotational speeds and for picking up the signal of a rotating magnetic encoder through a sensor element. The magnetic oscillations of the magnetic field caused by the encoder are detected by the sensor element, amplified and converted into two current levels by a processing unit. The frequency of the signal produced in this way is proportional to the rotational speed of the encoder.

The rotational speed active sensors currently used in the field of automotive passenger vehicles comprise a free data bit in the sensor log that can be used for transmitting further measured data. From DE 196 50 935 A1 it is known, for instance, to transmit through a common signal line, the data of a rotational speed sensor as well as additional data of further sensors, for example, data on the brake lining wear, on the interferric gap between the encoder and the sensor element, on the temperature at the wheel, on the deflection path of the oscillation dampers etc. through a common signal line. The data of the rotational speed sensor exist in the form of an alternating signal. A sequence of sensor pulses of a defined duration is gained from this alternating signal, the information on the rotational speed being contained in the pulse pauses. The additional data are also transmitted in the pulse pauses. A separation of the rotational speed sensor data and the additional data is assured through different signal levels or current amplitudes. If it is required to transmit the logic state 1 for a bit of the additional data, a current pulse is created during the time span reserved for this bit at a current level situated between a basic level (corresponding to the logic state 0) and the current level of the sensor pulse of the rotational speed sensor.

SUMMARY

It is the object of the invention to enable a reliable transmission of the sensor signals of a plurality of sensors through a data line of one of these sensors even if a smaller number of free bits are available in the sensor log than required for an information sequence of the further sensors.

The object is achieved according to the invention through a method for transmitting sensor data, in which method a first sensor, in particular a rotational speed sensor supplies an alternating signal which exists in the form of a sequence of sensor pulses and pulse pauses of a pre-defined duration, wherein in the pulse pauses additional data are transmitted as a bit sequence and wherein the bit sequence contains at least one free bit, a binary information sequence comprising data from at least one further sensor is generated, which has a transmission length of a plurality of bits, and the data of the first sensor and of the at least one further sensor are transmitted through a common data line in that a processing unit distributes the information sequence to a plurality of chronologically sequential bit sequences and overlays the at least one free bit of the additional data with at least one bit of the information sequence.

The first sensor is in particular a rotational speed sensor that supplies an alternating signal. At each flank alternation of the encoder, a sensor pulse is created. Additional data are transmitted as a bit sequence in the pulse pauses. Most of the bits of the bit sequence are, e.g. overlaid with data of the rotational speed sensor itself. In particular, only one single bit is free and is used for transmitting measured data of at least one further sensor. The measured data constitute an information sequence having a transmission length of a plurality of bits. The information sequence contains, for example, the binary measured data of a single sensor that possesses more than two states, so that a transmission length of a plurality of bits is required for its measured data. Alternatively, the information sequence comprises the measured data of a plurality of sensors irrespective of whether the sensors can identify only two states (low and high) or supply measured values with a high bit definition. In all cases, the information sequence is made up of a plurality of bits comprising more bit sequences than are free between two sensor pulses.

In addition to the rotational speed sensor, further sensors, for instance for detecting the brake lining wear, the tire pressure, the brake warming-up etc. can be used. Preferably, the further sensors are sensors that are not arranged directly in the region of the first sensor or of the processing unit so that they are connected via further data lines having a suitable length either indirectly or directly to the processing unit.

The invention is based on the deliberation that a reliable and interference-free transmission of binary information sequences having a transmission length that exceeds die number of available free bits is guaranteed in that the information sequence is divided into a plurality of binary information elements comprising, e.g. individual bits or forming groups of two or less bits, the information elements being distributed to a plurality of chronologically sequential bit sequences. If, for example, in a bit sequence, only one single bit is provided between two sensor pulses for the measured data of the further sensors, each of the information elements comprises a single bit of the information sequence. In this case, the information elements or the individual bits of the information sequence are transmitted one after the other in that the free bit of each further bit sequence is overlaid with the respective further bit of the information sequence. Due to the breakup of the information sequence into a plurality of small information elements which are separately transmitted, the length of the bit sequences during the pulse pauses can be kept short. The measured data of the further sensors are thus reliably transmitted even if the time window between two sensor pulses is relatively small and only small amounts of data can be transmitted in each cycle of the first sensor.

In order to enable an unambiguous identification of the start of the information sequence by the evaluation unit, according to a preferred variant, a start section is transmitted through the at least one free bit before the information sequence, and this start section is likewise distributed to a plurality of bit sequences. In particular, the transmission length of the start section corresponds to the transmission length of the information sequence. If the transmission length of the information sequence is n bits, the start section likewise comprises n bits. In the simplest case, all the n bits of the start section are overlaid only with 0 or only with 1.

An end of the information sequence is unequivocally identified by the evaluation unit in that, according to a further preferred variant, an end section is transmitted after the information sequence has been transmitted through the at least one free bit. The end section preferably comprises a free bit that is inverted relative to the last bit of the start section. In case the contents of the n bits of the information sequence corresponds to the contents of the n bits of the start section, by virtue of the bit of the end section, the evaluation unit can distinguish unequivocally between the start section and the information sequence.

If the transmission length of the start section of the information sequence were smaller than that of the information sequence, it could happen that the information sequence has the same configuration as the start section and thus could be erroneously identified by an evaluation unit not as an information sequence but as a start section. This situation is avoided in that the start section together with the end section is longer by at least one bit than the information sequence that follows. In order not to overlay too many bit sequences between the sensor pulses with the bits of the start section and of the end section, the start section preferably contains the same number of bits as the information sequence, and the end section contains exactly 1 bit.

Preferably, at least two further sensors are provided and the signals of the further sensors are transmitted through one single input on the processing unit. The processing unit is an electric circuit that is arranged near the sensors, e.g. for signal processing, for digitalization, for filtering and/or amplifying signals of all the sensors. The processing unit is preferably an application-specific integrated circuit (ASIC) that is associated to the first sensor and transmits the data both of the first as also of the further sensors through the data line of the first sensor to the distal evaluation unit. With a view to a simplest possible structure of the processing unit, this processing unit communicates with the at least two further sensors through a single input. This is achieved in that, advantageously, a serialization module is disposed between the further sensors and the processing unit, which serialization module generates the information sequence out of the signals of the at least two further sensors and transmits this through an intermediate line to the processing unit. The serialization module is likewise configured as an electric circuit whose main function is to create the information sequence out of the signals of a plurality of sensors and to supply this processed information sequence to the processing unit. The function of the serialization module is alternatively widened in that the serialization module additionally takes over some of the functions of the processing unit or performs these functions doubly, parallel to the processing unit.

The measured data of the first sensor to which the processing unit is associated are transmitted through a first data line. According to a preferred embodiment, the sensor signal of the first sensor is transmitted through the first data line to the processing unit. The measured values of the further sensors are transmitted either through cable lines or telemetrically to the serialization module. The processing of the data of the first sensor is performed separately from the processing of the data of the further sensors that takes place in the serialization module. According to an alternative preferred embodiment, the sensor signal of the first sensor is transmitted through the first data line to the serialization module. In this case, the serialization module is used for digitalization, processing and serialization both of the data of the first sensor as also those of the further sensors.

Appropriately, the processing unit, which is associated in this case to the first sensor, is lodged in a sensor housing of the first sensor. The first sensor and the processing unit form an assembly so that the measured data of the further sensors are transmitted to the first sensor so that these can be transmitted to the processing unit through the data line of the first sensor.

The further sensors are in particular passive sensors without an own electric supply connection. The current used for operating the further sensors is in particular the current flowing through the data lines between the further sensors and the serialization module.

Preferably, the serialization module is supplied with electric energy out of the processing unit conveyed through the intermediate line. The intermediate line is that data line through which the information sequence generated in the serialization module is transmitted to the processing unit. This intermediate line is configured not only for transmitting data from the serialization module to the processing unit but also for feeding electric energy out of the processing unit into the serialization module. In this case, the processing unit can have an own current source or, alternatively or complementarily, the processing unit is supplied with current through the common data line.

In case the common data line is also used for supplying current, according to an alternative, preferred development of the invention, the serialization module is supplied with electric energy through a current line branched off the common data line. In this way, a parallel current path is created that by-passes the processing unit and through which energy out of the common data line is fed directly into the serialization module. This development is advantageous in the case of further sensors consuming current in a highly undefined manner.

The object of the invention is further achieved through an arrangement for transmitting sensor signals according to one of the preceding embodiments of the method, comprising a first sensor, in particular a rotational speed sensor, at least one further sensor as also a processing unit.

The advantages and preferred embodiments of the method of the invention are also applicable analogously to the arrangement.

BRIEF DESCRIPTION OF THE DRAWINGS

Examples of embodiment of the invention will now be described more closely with reference to an appended drawing. The figures are schematic and strongly simplified.

FIGS. 2-8 show different examples of embodiment of an arrangement for detecting and transmitting sensor signals, and FIG. 9 shows the chronological progress of a sensor log.

Identical reference numerals in the different figures have the same meaning.

DETAILED DESCRIPTION OF THE PREFERRED EMBODIMENTS

Figure 1:
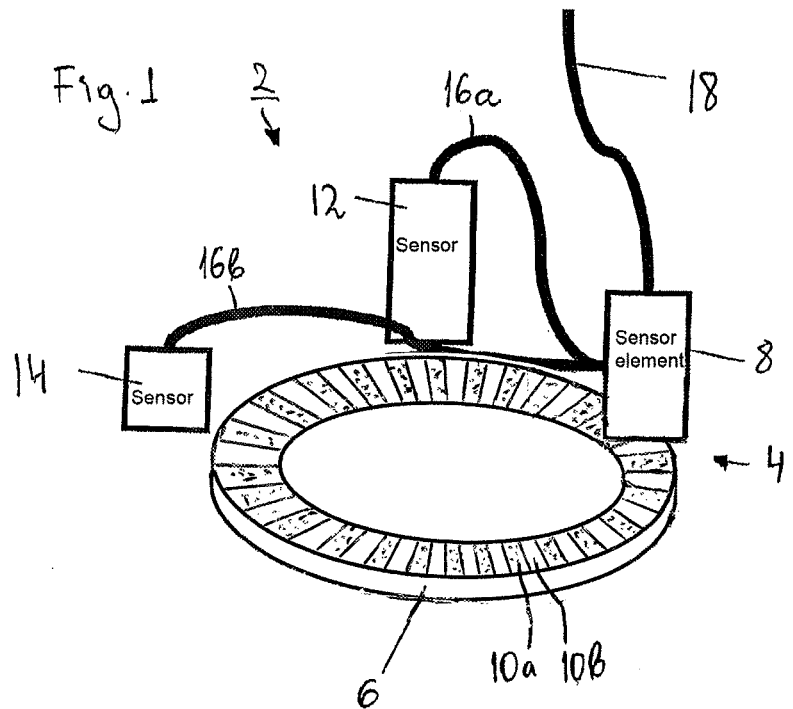
FIG. 1 shows an arrangement of a plurality of sensors in an automotive vehicle.

FIG. 1 illustrates a sensor arrangement 2 comprising three sensors. A first sensor is a rotational speed sensor 4 that comprises a pulse wheel or encoder 6 as well as a sensor element 8. The encoder 6 is arranged on a rotating component, not shown, e.g. on a wheel axle in an automotive vehicle and rotates together with this component. The sensor element 8 is arranged on stationary component, likewise not shown, in the vicinity of the encoder 6. The encoder 6 comprises along its periphery, a plurality of regions 10a, 10b that are magnetized and comprise north and south poles. During rotation of the encoder, the alternation of the different magnetic regions 10a, 10b are detected by the sensor element 8. This sensor element 8 is in particular a Hall sensor or a magneto resistive sensor that supplies an output signal proportionate to the density of magnetic flow.

Three further sensors 12, 14 are arranged in the vicinity of the rotational speed sensor 4 and are connected to the rotational speed sensor 4 through data lines 16a, 16b for transmitting the sensor data of all three sensors collectively through a data line 18 of the rotational speed sensor 4 to an evaluating unit, not shown.

The sensor 12 is, e.g. a distance sensor that is configured as a Hall or MR element. Ideally, the distance sensor 12 is positioned so as to be situated centrally above a magnetic pole of the encoder 6 just at the moment when a flank alternation of the rotational speed sensor 4 takes place.

The third sensor 14 measures the temperature in the region of the encoder 6 in order to indicate impermissible temperatures and, if necessary, to free the output signal of the distance sensor 12 from temperature influences. The temperature sensor 14 can likewise be a Hall or MR element.

Figure 2:
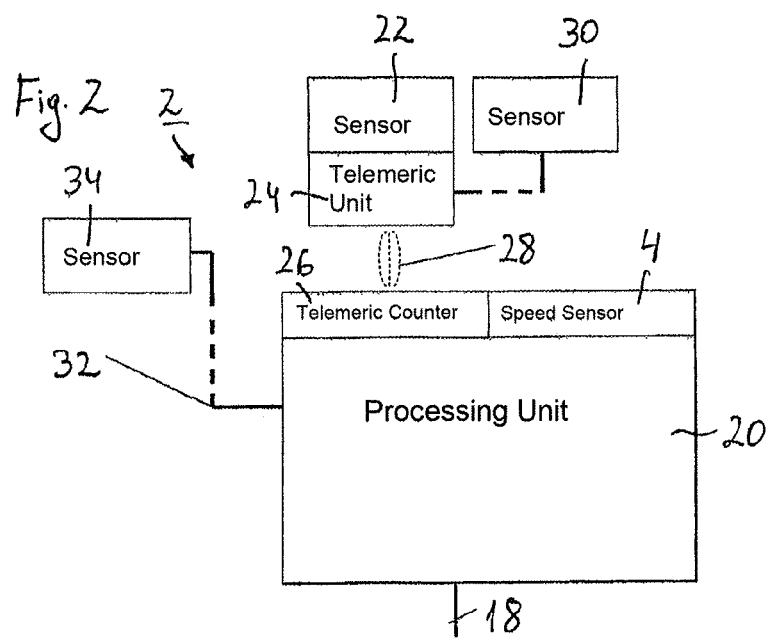

FIG. 2 shows different modes of communication between the sensors 4, 22, 30, 34 of a further sensor arrangement 2 when their sensor signals are transmitted through the common data line 18. In the example of embodiment shown, a first sensor, in this case the rotational speed sensor 4 comprises a processing unit 20 that is formed by an electric circuit that edits and digitalizes the sensor signals. A second sensor 22 is in wireless communication with the first sensor 4 via a telemetric unit 24. Accordingly the first sensor 4 comprises a telemetric counter unit 26. A telemetric coupling between the second sensor 22 and the first sensor 4 is indicated through interrupted lines 28. The rotational speed sensor 4, the processing unit 20 and the telemetric counter unit 26 together form an assembly and are lodged in a common housing. In the present example of embodiment, the telemetric unit 24 also transmits measured data of a further sensor 30 to the processing unit 20. Alternatively to a telemetric connection, the sensor data can be transmitted through a cable to the processing unit 20 through a cable, as is the case with the sensor 34 in FIG. 2.

The further sensors 22, 30, 34 that are connected with respect to data to the first sensor, in the present case the rotational speed sensor 4, are, for example sensors for measuring temperature, distance, structure-borne noise, expansion, force, leaks, oil/grease quality, tire inflation pressure, brake lining wear or braking force.

FIGS. 3 to 8 show different examples of embodiment of an arrangement for detecting and transmitting sensor signals. All these variants of embodiment have something in common, namely that a serialization module 36 is disposed between the sensors 38a, 38b and the processing unit 20, which serialization module 36, even before the processing unit 20, digitalizes, edits and combines the sensor signals, at least of the further sensors 38a, 38b, in the form of a binary information sequence. By virtue of the serialization module 36, it is possible to transmit the sensor signals of two or more further sensors 38a, 38b via a single input 40 to the processing unit 20. For this purpose, the invention provides an intermediate line 41 through which, in addition, the serialization module is fed with electrical energy out of the processing unit 20. A source of energy can be integrated into the processing unit 20. In the examples of embodiment shown, however, the processing unit 20 is supplied with energy through the common data line 18.

According to FIG. 3, the sensor signal of the rotational speed sensor 4 is transmitted through a first data line 42 directly to the processing unit 20. The measured data of the further sensors 38a, 38b, however, are all transmitted through further data lines 44 at first to the serialization module 36. The measured data determined with the help of the sensors 4, 38a, 38b can also be transmitted alternatively by telemetry to the processing unit 20 or to the serialization module 36.

The sensor arrangement 2 according to FIG. 4 differs from that of FIG. 3 only by the fact that a current line 46 extending parallel to the intermediate line 41 is branched off the common data line 18 for supplying energy to the serialization module 36 and thus to the further sensors 38a, 38b.

In the example of embodiment of FIG. 5, it is not only the sensor signals of the further sensors 38a, 38b but also the measured data of the rotational speed sensor 4 that are transmitted to the serialization module 36 from where they are routed further in serialized form to the processing unit 20. The supply of current to the serialization module 36 is realized in this case through the current line 46.

In FIG. 6, the rotational speed sensor 4 and the processing unit 20 are configured as a single component and lodged in a sensor housing 48. The supply of energy to the serialization module 36 is realized through the intermediate line 41.

Figure 7:
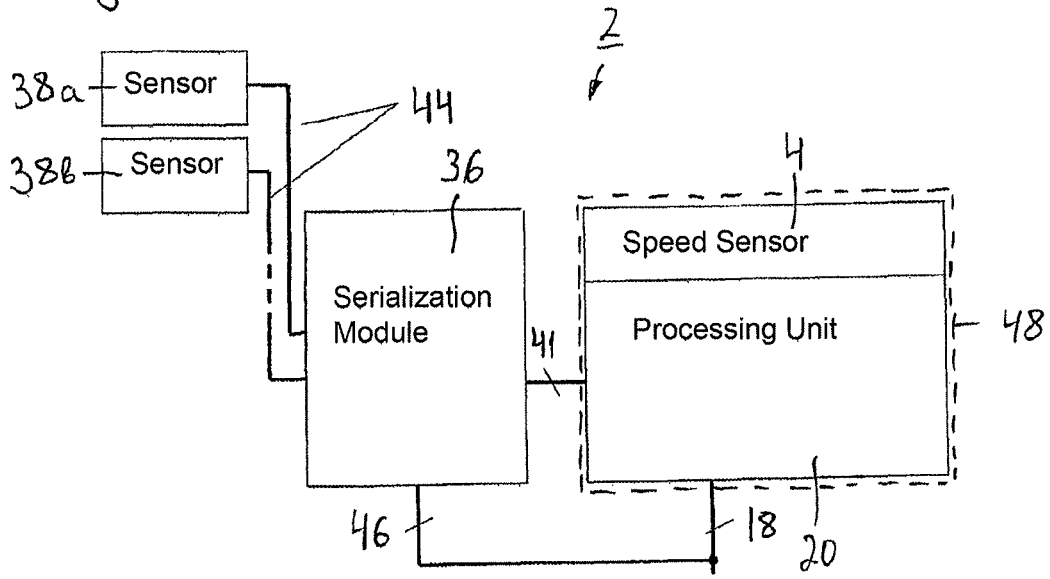

The sensor arrangement 2 according to FIG. 7 differs from that of FIG. 6 only by the fact that, for the supply of energy to the serialization module 36, the current line is branched off the common data line 18 46.

Figure 8:
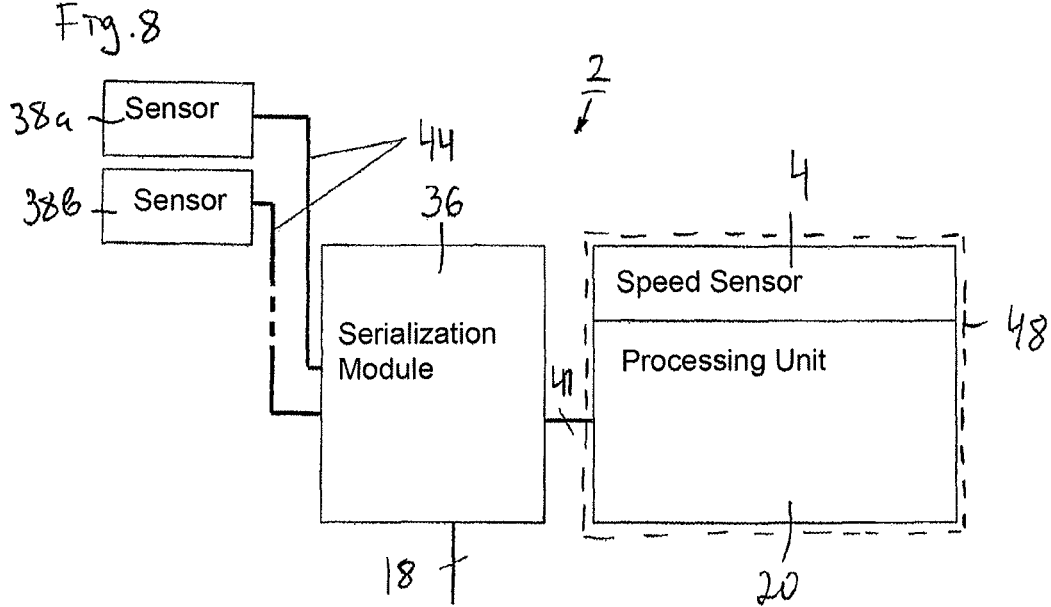

FIG. 8 shows a constellation of the sensor arrangement 2 in which the common data line 18, that also serves for a supply of energy, is connected to the serialization module 36. The rotational speed sensor 4 and the associated processing unit 20 form, in this case too, a unit that transmits the measured data of the rotational speed sensor 4 through the intermediate line 41 to the serialization module 36 and also supplies this with current.

The principle of data transmission through the common data line 18 is represented graphically in FIG. 9. At an alternation of the north and south regions of the encoder 6, the sensor element 8 generates an alternating signal that results from sensor pulses 50 and sensor pauses 52 of a pre-defined duration. The duration of a cycle between two sensor pulses 50 depends on the speed of rotation of the encoder 6. Additional data 54 in the form of bit sequences are transmitted in the pulse pauses 52. The instantaneous current level on the data transmission line is evaluated for identifying the transmitted rotational speed data and additional data, and for separating these data. In the bit sequences of the additional data 54, the logical state 0 is identified through a basic current $I_0$. The basic current $I_0$ likewise gets set in the pulse pauses 52. The sensor pulses 50 are given through a maximum current $I_{max}$. Between the basic current $I_0$ and the maximum current $I_{max}$ is situated the current level $I_H$ of the additional data 54. A bit with the logical state 1 is represented through a current with a magnitude of $I_H$.

In the example of embodiment of FIG. 9, all further bits 58, with the exception of one free bit 56, are overlaid with the data of the rotational speed sensor 4. The only free bit of each cycle is utilized for transmitting the information delivered by the further sensors 38a, 38b. To realize this, the measured data of the further sensors are combined into a binary information sequence 60 that is then divided into individual information elements comprising one bit each, and each element is transmitted with the respective further bit sequence during the next cycle. The information sequence 60 is thus broken down into individual bits that are distributed to a plurality of chronologically sequential bit sequences of the additional data 54.

For example, the sensor arrangement 2 comprises, in addition to the rotational speed sensor 4, three further sensors: a first sensor 38a, a second sensor 38b and a third sensor, not shown, that is identified at 38c. Each of the first sensor 38a and second sensor 38b knows two states: the state "low" identified at 0 and the state "high" identified at 1. In the information sequence 60, one bit is assigned to each of the first two sensors 38a, 38b. The third sensor 38c transmits measured values with a high definition, of e.g. four bits. When the first sensor 38a has the state "high", the second sensor 38b has the state "low" and the third sensor 38c transmits the bit sequence 0-1-1-0, the information sequence 60 is composed of the numerals 1-0-0-1-1-0. These six bits are transmitted individually in the pulse pauses 52 of six successive cycles.

Prior to the information sequence 60, a start section 62 is transmitted. The transmission length of the start section 62 is identical to the transmission length of the information sequence 60. The information sequence 60 has a transmission length of six bits, thus the transmission length of the start section 62 is likewise six bits. All six bits for the start section are overlaid in this example of embodiment with the state 1 and are transmitted through the free bit 56 of the additional data 54 in six successive cycles to the evaluation unit and signalize that the measured data of the further sensors are next to follow. The transmission of the information sequence 60 is terminated with an end section 64 that is shown as a "low" signal (0). The transmission length of the end section 64 together with the start section 62 (total of 7 bits) is thus longer than the transmission length of the information sequence 60 by one bit. This prevents the evaluation unit from erroneously detecting a start section 62 when the information sequence 60 comprises a plurality of successive "high" signals.

The important advantage of this principle of data transmission is that, through one single free bit 56, data of a plurality of further sensors 38a, 38b, 38c that form an information sequence 60 with a transmission length of a plurality of bits, are transmitted in a flexible manner. Decisive for the transmission of the information sequence 60 is not only the number of free bits, but also that the transmission of data is based on breaking down the measured data into individual bits that are transmitted chronologically one after the other in a plurality of cycles to the evaluation unit.

LIST OF REFERENCE NUMERALS

2 Arrangement
4 Rotational speed sensor
6 Encoder
8 Sensor element of the rotational speed sensor
10a, 10b Regions
12 Sensor
14 Sensor
16a, 16b Additional lines
18 Common data line
20 Processing unit
22 Sensor
24 Telemetric unit
26 Telemetric counter unit
28 Telemetric coupling
30 Sensor
32 Cable
34 Sensor
36 Serialization module
38a, b, c Sensor
40 Input
41 Intermediate line
42 First data line
44 Further data lines
46 Current line
48 Housing
50 Sensor pulse
52 Pulse pause
54 Additional data
56 Free bit
58 Bit for data of the rotational speed sensor
60 Information sequence
62 Start section
64 End section
$I_0$ Basic current
$I_H$ Current level
$I_{max}$ Maximum current

The invention claimed is:

1. A method for transmitting sensor signals, comprising:
   supplying an alternating signal which exists as a sequence of sensor pulses and pulse pauses of a pre-defined duration from a first sensor, wherein in the pulse pauses additional data are transmitted as a bit sequence and wherein the bit sequence contains at least one free bit,
   generating a binary information sequence comprising data from at least one further sensor, which has a transmission length of a plurality of bits, and
   transmitting the data of the first sensor and of the at least one further sensor through a common data line, and distributing the binary information sequence to a plurality of chronologically sequential bit sequences and overlaying the at least one free bit of the additional data with at least one bit of the binary information sequence using a processing unit.

2. A method according to claim 1, wherein a start section is transmitted through the at least one free bit before the binary information sequence and the start section is likewise distributed to a plurality of bit sequences.

3. A method according to claim 2, wherein an end section is transmitted after the binary information sequence has been transmitted by the at least one free bit.

4. A method according to claim 1, wherein at least two further sensors are provided and the signals of the at least two further sensors are transmitted through one single input on the processing unit.

5. A method according to claim 4, wherein a serialization module is disposed between the further sensors and the processing unit, said serialization module generates the binary information sequence out of the signals of the at least two further sensors and transmits this through an intermediate line to the processing unit.

6. A method according to claim 5, wherein the serialization module is supplied with electric energy out of the processing unit through the intermediate line.

7. A method according to claim 5, wherein a common data line is used for supplying energy to the processing unit, and the serialization module is supplied with electric energy through a current line branched off the common data line.

8. A method according to claim 1, wherein the sensor signal of the first sensor is transmitted through a first data line to the processing unit.

9. A method according to claim 1, wherein the processing unit is lodged in a sensor housing of the first sensor.

10. The method according to claim 1, wherein the first sensor is a rotational speed sensor.

11. An arrangement for transmitting sensor signals according to the method of claim 1, wherein said arrangement comprises the first sensor, the at least one further sensor, as well as the processing unit.

12. The arrangement of claim 11, wherein the first sensor is a rotational speed sensor.

* * * * *